United States Patent

[11] 3,615,730

| [72] | Inventors | Gabriel H. Law<br>Orange;<br>Paul D. Van Dorsten, Diamond Bar, both of Calif. |
|---|---|---|
| [21] | Appl. No. | 9,043 |
| [22] | Filed | Feb. 5, 1970 |
| [45] | Patented | Oct. 26, 1971 |
| [73] | Assignee | Amercoat Corporation<br>Brea, Calif. |

[54] PROTECTIVE COATING
10 Claims, No Drawings

[52] U.S. Cl. .................................................... 106/1,
        106/14, 106/287, 117/131, 117/135.1, 252/387
[51] Int. Cl. .................................................... C09d 5/10
[50] Field of Search ............................................ 106/1, 14,
        287 A, 287 B, 287 C; 117/131, 135.1; 252/309,
        387

[56] References Cited
UNITED STATES PATENTS

| 3,056,684 | 10/1962 | Lopafa et al. ................. | 106/14 |
| 3,142,583 | 7/1964 | McMahon ..................... | 117/135.1 |
| 3,469,071 | 9/1969 | Feldt et al. .................... | 117/135.1 X |

Primary Examiner—Lorenzo B. Hayes
Attorney—Hinderstein & Silber

ABSTRACT: An inorganic zinc-rich coating for the protection of ferrous surfaces consisting of zinc dust in a vehicle comprising a substantially nonaqueous colloidal suspension of silica in ethylene glycol monoethyl ether or other polar solvent. Small amounts of zinc chloride and, optionally, magnesium oxide are added to the vehicle to promote film hardness. The coating may be prepared by fractional distillation of an aqueous, acid-stabilized colloidal silica sol premixed with a polar solvent, with subsequent addition of zinc chloride, magnesium oxide and zinc dust to the solvent dispersion.

PROTECTIVE COATING

FIELD OF THE INVENTION

The present invention relates to an inorganic, zinc-rich protective coating for ferrous surfaces, and more particularly to a zinc-rich coating in which the vehicle comprises a substantially nonaqueous colloidal suspension of silica in a polar solvent.

DESCRIPTION OF THE PRIOR ART

Zinc-rich protective coatings have become widely accepted for the protection of ferrous surfaces against corrosion. The metallic zinc in the coating provides a cathodic protection to steel, the corrosive reactions taking place selectively on the zinc which places higher than iron in the electromotive series. While a wide variety of binder vehicles for zinc-rich coatings have been available in the past, none has been completely satisfactory for lining the interior of cargo storage tanks, fuel oil tanks, salt water ballast tanks or other enclosed spaces of limited volume.

A number of unique problems are encountered when coating such tank interiors, foremost being the danger of explosion associated with the low flash point of the coating. This problem is particularly acute in the case of ship tanks which are of small, totally enclosed volume. Thus if the coating vehicle includes low flash point, volatile solvents which may evaporate during application, a sufficiently high concentration of volatiles may accumulate within these tanks to be potentially explosive.

A second problem is associated with sensitivity of the coating to atmospheric moisture, both in the pot and after the coating has been applied to the surfaces but before it has hardened. This problem is particularly acute in the treatment of cargo tanks on commercial ships. For such applications, there is often high atmospheric humidity present when the coating is applied.

Further, it is desirable that the coating exhibit good solvent resistance, stable shelf life, long pot life, good adhesion to steel surfaces, and not be susceptible to cracking.

A number of water-based zinc-rich coatings, primarily based on alkali-stabilized colloidal silica binders have been available in the past. Such water-based coatings do not include volatile solvents and so are free of the explosion problem when applied in restricted areas. However, and particularly significant for maritime applications, such materials tend to be water sensitive before hardening. Thus, if the coating is applied in a high-moisture atmosphere, the applied film will dry slowly and considerable care must be taken to avoid accidentally scraping or otherwise removing portions of the applied film before it is dry. Moreover, it is not uncommon that 5 or more days may be required for the dry film to harden to a pencil hardness of 6H. During this extended period of time, the newly coated tank cannot be used; as a result, such long curing times are undesirable for most commercial applications. Another problem associated with such coatings is that of relatively short pot life, resulting in part from reaction of zinc with water present in the binder. This reaction, which occurs when zinc is mixed with the binder prior to application, causes gassing and gellation of the coating in the pot.

A variety of zinc-rich coatings using binders of ethyl silicate in organic solvents also are available commercially. For example, these employ a partially hydrolyzed ethyl silicate having a relatively high molecular weight. When the coating is applied, hardening occurs as the hydrolysis is completed. Such coatings are characterized by relatively slow curing times; often the coating still is soft several hours after application. Moreover, the solvents generally used exhibit a low flash point and hence are unacceptable for coatings to be applied to cargo tank interiors. Such coatings also are sensitive to humidity prior to application. Thus atmospheric moisture causes further hydrolysis of the silicate in the pot, resulting in premature gellation and short pot life.

One approach of the prior art toward improving the flash point problem is to use a high boiling point solvent with an ethyl silicate binder. While this raises the flash point somewhat, the extent to which the flash point can be increased is limited by the curing mechanism itself. In particular, hydrolysis of ethyl silicate liberates ethyl alcohol which itself has a low flash point. Thus even though a high boiling point solvent is used, the resultant coating still exhibits relatively low flash. Flash points on the order of 50° to 60° F., as measured by the Pensky-Martens closed cup method (ASTM D-93 are typical for such coatings.

Another approach of the prior art is to utilize a partially hydrolyzed ethoxy ethyl or methoxy ethyl silicate together with a high boiling point solvent as a vehicle for the zinc dust. By employing such a silicate, the flash point is increased significantly. However, the percentage of silica in such a coating is very small and as a result, the coating exhibits poor film hardness. Moreover, such coatings are sensitive to atmospheric moisture and, because complete hydrolysis does not occur rapidly, such coatings are slow to harden.

These and other shortcomings of the prior art are overcome by the inventive zinc-rich protective coating. The coating is substantially nonaqueous, has very low sensitivity to atmospheric moisture before hardening, and cures rapidly, typically achieving a pencil hardness of 5H in less than a 24-hour period. The coating has a stable shelf life and a pot life on the order of several days. Moreover, the applied films have high solvent resistance, exhibit no cracking, and have good adhesion to steel surfaces. Certain embodiments of the inventive coating exhibit high flash point, typified by Pensky-Martens closed cup values above 100° F. These characteristics make the inventive coating uniquely suited for the treatment of tank linings and for other uses wherein the coating must be applied in a confined area and/or under high-humidity conditions.

SUMMARY OF THE INVENTION

In accordance with the present invention, there is provided an inorganic zinc-rich coating for the protection of ferrous surfaces. The coating vehicle comprises a substantially nonaqueous colloidal suspension of silica in a polar solvent, preferably ethylene glycol monoethyl ether, together with a small amount of zinc chloride and, optionally magnesium oxide. The $ZnCl_2$ and $MgO$ each promote hardness of the applied films. Zinc dust is mixed with the vehicle to complete the coating.

The coating may be prepared by combining a polar solvent with an acid-stabilized, aqueous colloidal silica sol, followed by fractional distillation to eliminate substantially all of the water. Zinc chloride in amounts of from 0.5 to 3 parts by weight of zinc chloride for each 100 parts by weight of zinc dust is added to the residue. From 5 to 25 parts by weight of zinc dust for each 1 part by weight of silica then is added to the vehicle prior to application to a surface.

The resultant coating thus incorporates a novel type of inorganic binder for zinc dust. Certain embodiments of the invention are characterized by having high flash points, and thus are particularly useful for application in confined areas, such as ship tanks and the like.

Thus it is an object of the present invention to provide an improved inorganic zinc-rich coating.

Another object of the present invention is to provide a zinc-rich protective coating utilizing as a vehicle a substantially nonaqueous colloidal suspension of silica in a polar solvent.

It is another object of the present invention to provide a coating comprising a substantially nonaqueous colloidal suspension of silica in ethylene glycol monoethyl ether, together with small amounts of zinc chloride to promote film hardness.

Still another object of the present invention is to provide an inorganic zinc-rich coating for the protection of ferrous surfaces and including a substantially nonaqueous colloidal suspension of silica in ethylene glycol monoethyl ether, zinc dust, and zinc chloride and magnesium oxide additives to promote hardness of the resultant coating.

A further object of the present invention is to provide an inorganic zinc-rich coating having a high flash point.

Yet a further object of the present invention is to provide a method of making a protective coating for metal surfaces wherein the coating includes a substantially nonaqueous colloidal silica dispersion.

Still other objects, features and attendant advantages of the present invention will become apparent to those skilled in the art from the following description of the preferred embodiments.

DESCRIPTION OF THE PREFERRED EMBODIMENTS

The inventive high flash point zinc-rich protective coating utilizes as a vehicle a substantially nonaqueous colloidal suspension of silica in a polar solvent, together with a small amount of zinc chloride and, optionally, magnesium oxide to promote hardness of the applied coating films. Fine particle zinc dust is added to the vehicle prior to application.

In a preferred embodiment, the colloidal suspension incorporates silica particles having an average size of from 16 to 22 millimicrons. The silica, present as $SiO_2$, accounts for between 30 and 60 percent by weight of the combined silica and solvent. Preferably the solvent comprises ethylene glycol monoethyl ether (also known as ethyl Cellosolve), since this solvent has a boiling point sufficiently different from that of water to facilitate preparation of the nonaqueous dispersion by fractional distillation, as described in detail hereinbelow. Alternatively, methyl or butyl Cellosolve may be used. Other polar solvents, such as alcohol, ketones, esters, substituted amines or cyclic ethers also may be useful in, or added to the sol. Typically, the colloidal suspension is acidic, exhibiting a pH on the order of from 3 to 4 (as measured in 50 percent dilution with water). For optimum results, the water content of the colloidal suspension should be less than about 3 percent.

To promote film hardness, zinc chloride in a concentration of from 0.5 to 3 parts by weight for each 100 parts by weight of zinc dust is added to the acid-stabilized silica sol binder. Optimum results are obtained with a zinc dust concentration of between about 1.5 and about 2.5 parts by weight for each 100 parts by weight of zinc dust. As illustrated by the examples described hereinbelow, the zinc chloride significantly improves the hardness of the resultant coating films. Optionally, magnesium oxide in a concentration of less than about 0.4 parts by weight for each one part by weight of zinc chloride also may be added to further enhance the film hardness characteristics.

To complete the coating, zinc dust in the form of particles preferably having a size range of from about 4 to about 10 microns are combined with the coating vehicle. Useful coating formulations include zinc dust concentrations of from 5 to 25 parts by weight for each one part by weight of silica in the vehicle. Optimum coatings are obtained when using zinc dust in concentrations of from about 10 to about 15 parts by weight for each one part by weight of silica.

The following table 1 shows several protective coating formulations in accordance with the present invention; these formulations differ from one another only in zinc dust concentration. Unless otherwise indicated, all concentration values are listed in parts by weight.

TABLE 1

| Ingredients | I | II | III | IV |
|---|---|---|---|---|
| Colloidal silica | 10 | 10 | 10 | 10 |
| Ethylene glycol monoethyl ether | 18 | 18 | 18 | 18 |
| Zinc Chloride | 3 | 3 | 3 | 3 |
| (parts by weight per 100 parts by weight of zinc dust) | (6) | (3) | (2) | (1.2) |
| Zinc dust | 50 | 100 | 150 | 250 |
| (parts by weight per one part by weight of silica) | (5) | (10) | (15) | (25) |

Each of the coating formulations in table 1 exhibited a high flash point, on the order of 102° F. as measured by the Pensky-Martens closed cup technique. The Tag open cup flash point of each of these coatings was on the order of 130° F. The coatings all exhibited low sensitivity to atmospheric moisture. Formulations II and III exhibited excellent film hardness. Because of the relatively low zinc dust concentration, coating formulation I resulted in a film which was somewhat brittle, and which had poor corrosion resistance. The films prepared from formulation IV were somewhat soft and were not well bound to the steel; this resulted from the high percentage of zinc dust compared with the amount of silica in the binder. That is, insufficient silica is present to bind the zinc dust satisfactorily. Coating formulation IV also was difficult to spray.

The effect of zinc chloride concentration on film hardness is illustrated by table 2. In the formulations set forth therein, the colloidal silica and ethylene glycol monoethyl ether concentrations are the same as for formulations I through IV. The zinc dust concentration of 130 parts (equal to 13 parts by weight for each 1 part by weight of colloidal silica) lies within the preferred range for zinc dust. In table 2, the zinc chloride concentration ranges from 0 (formulation V) to 4.2 (formulation X) parts by weight of the coating. This corresponded to a $ZnCl_2$ range of from 0 to 3.2 parts by weight for each 100 parts by weight of zinc dust.

TABLE 2

| Ingredients | V | VI | VII | VIII | IX | X |
|---|---|---|---|---|---|---|
| Colloidal silica | 10 | 10 | 10 | 10 | 10 | 10 |
| Ethylene glycol monoethyl ether | 18 | 18 | 18 | 18 | 18 | 18 |
| Zinc chloride | 0 | .65 | 1.8 | 2.8 | 3.5 | 4.2 |
| (p.b.w. per 100 p.b.w. of zinc dust) | (0) | (.5) | (1.4) | (2.15) | (2.7) | (3.2) |
| Zinc dust | 130 | 130 | 130 | 130 | 130 | 130 |

Coating formulation VIII gave optimum performance, and exhibited excellent film hardness, fast curing, very low sensitivity to moisture, good corrosion resistance, and excellent binding to steel. Formulations VI, VII and IX exhibited hardness characteristics almost as good as that of formulation VII. Formulations VI, VII and IX also exhibited fast cure, very low sensitivity to moisture, and only slightly reduced corrosion resistance from that of formulation VIII. Formulation V (table 2), in which no zinc chloride is included, resulted in films which were soft and unacceptable. Using formulation X, the resultant films also were soft and exhibited poor corrosion resistance. Formulation X had a high viscosity which made it difficult to spray.

Thus is may be seen that the operable range of zinc chloride concentration is from about 0.5 to about 3 parts by weight of zinc chloride per 100 parts by weight of zinc dust in the coating. The preferred $ZnCl_2$ concentration range is from about 1.5 to about 2.5 parts by weight for each 100 parts by weight of zinc dust. Films formed from coating formulations having this preferred $ZnCl_2$ concentration hardened quite rapidly, typically exhibiting a pencil hardness of 5 H in less than 24 hours after application.

Table 3 below shows additional coating formulations in accordance with the present invention and including various amounts of magnesium oxide.

TABLE 3

| Ingredients | XI | XII | XIII | XIV |
|---|---|---|---|---|

| | | | | |
|---|---|---|---|---|
| Colloidal silica | 10 | 10 | 10 | 10 |
| Ethylene glycol monoethyl ether | 18 | 18 | 18 | 18 |
| Zinc chloride | 3 | 3 | 3 | 3 |
| Magnesium oxide | 0 | 0.3 | 0.6 | 1.4 |
| (parts by weight per one part by weight of ZnCl$_2$ | (0) | (0.1) | (0.2) | (0.47) |
| Zinc dust | 130 | 130 | 130 | 130 |

Comparison of films applied from coating formulations XI through XIV indicated that hardness improved with the addition of MgO up to a concentration of about 0.4 parts by weight for each one part by weight of zinc chloride. Optimum film hardness was achieved with formulation XII. As the concentration of MgO increased, the thixotropy of the coating appeared to decrease slightly. With MgO concentrations of greater than about 0.4 parts by weight per one part by weight of zinc chloride, the coatings exhibited undesirable high viscosity and gellation.

Each of formulations V through XIV exhibited a high flash point, all being on the order of 102° F., when measured by the Pensky-Martens closed cup method, or 130° F., for the Tag open cup method. Although in each of formulations I through XIV the silica concentration (as SiO$_2$) in the sol is approximately 35 percent, the invention is not so limited. Other operative formulations include silica concentrations of from about 30 to about 60 percent of the sol.

Further, polar organic solvents miscible with ethylene glycol monoethyl ether may be used to dilute the coating vehicle without loss of the colloidal properties of the silica. For example, isopropyl alcohol, a polar solvent, may be added to any of the formulations I-XIV described above, in amounts up to or even greater than the combined weight of silica and ethylene glycol monoethyl ether in the formulation, without causing precipitation of the silica. Table 4 sets forth an exemplory formulation XV.

TABLE 4

| Ingredients | XV |
|---|---|
| Colloidal Silica | 10 |
| Ethylene glycol monoethyl ether | 18 |
| Isopropyl alcohol | 28 |
| Zinc chloride | 3 |
| Magnesium oxide | 0.3 |
| Zinc dust | 130 |

Note that formulation XV is identical to formulation XII above, with the addition of an amount of isopropyl alcohol equal to the combined parts by weight of colloidal silica and ethylene glycol monoethyl ether. Films produced with formulation XV also exhibited good film hardness, fast cure, low sensitivity to moisture and excellent binding to steel.

Because the dilution with isopropyl alcohol results in a lower weight percentage of zinc in the coating, films prepared from formulation XV are somewhat thinner than films prepared from formulation XII. Thus formulation XV is particularly suitable for use as a preconstruction primer, for example, to provide protection to steel plates prior to their incorporation into a structure such as a ship. The finished structure then would receive a final protective coating prepared, e.g., from formulation XII.

The presence of isopropyl alcohol in a coating vehicle of course reduces the flash point of the coating. Thus formulation XV exhibits a Tag open cup flash point on the order of 85° F.

As noted, highly polar solvents other than isopropyl alcohol also can be incorporated in the inventive coatings without causing precipitation of the colloidal silica. Such other highly polar solvents include, but are not limited to butyl alcohol, methyl isobutyl ketone and butyl acetate, representative respectively of useful alcohols, ketones and esters. Preferrably the weight amount of such highly polar solvent used should be less than about 2.5 times the combined weight amount of silica and ethylene glycol monoethyl ether. This will insure that at least about 10 percent of the coating vehicle (excluding zinc) is silica.

Further, aromatic or aliphatic solvents which are slightly less polar than isopropyl alcohol also can be incorporated, but in lesser amounts. For example, if xylol is added to various of the formulations I-XIV described above, in weight amounts equal to the combined silica and ethylene glycol monoethyl ether, the resultant coatings are stable for periods up to about a month. Thereafter, some silica precipitation is noted. For lesser weight amounts of xylol, longer stable lifetimes are achieved. Similar results are achieved when using other aromatic hydrocarbon solvents such as toluol or high-flash naptha.

Similarly, aliphatic hydrocarbon solvents such as mineral spirits can be added to the inventive coatings. However, silica precipitation begins with lesser concentrations of mineral spirits present than with the more polar xylol. For example, in a mixture of 100 parts by weight combined silica and ethylene glycol monoethyl ether, 5 parts by weight ZnCl$_2$ and 30 parts by weight mineral spirits, no silica precipitation was noted over an extended period of time. However, when the mineral spirits concentration was increased to about 50 parts by weight, the solution became cloudy and light precipitation of silica was noted within a week.

A nonaqueous colloidal silica suspension useful in the inventive protective coatings may be prepared by fractional distillation of a mixture of an aqueous colloidal silica dispersion and an appropriate polar solvent. For example, the sol may be prepared from a commercially available, acid-stabilized, aqueous colloidal silica dispersion sold under the trademark Nalcoag 1034A. This material is an aqueous colloidal silica dispersion having a pH of about 3.1 and including 34 percent silica as SiO$_2$ with an average silica particle size of between 16 and 22 millimicrons.

The above-described aqueous colloidal silica dispersion, which may be deionized, is mixed with an appropriate polar solvent such as ethylene glycol monoethyl ether. The mixture is fractionally distilled under vacuum conditions at a temperature on the order of 50° C. Distillation is performed slowly, to insure separation of the water from the ethylene glycol monoethyl ether, care being taken to maintain the conditions correctly so that a minimum of solvent is evaporated, despite the closeness in miscibility and boiling point between water and the Cellosolve. The residual composition comprises a nonaqueous colloidal silica suspension.

The coating vehicle then may be formed by adding appropriate amounts of zinc chloride and, optionally, magnesium oxide to the residue. Zinc dust, in appropriate weight amounts as described hereinabove, then may be added to the vehicle to complete the coating.

While the invention has been described with respect to the preferred embodiments constructed in accordance therewith, it will be apparent to those skilled in the art that various modifications and improvements may be made without departing from the scope and spirit of the invention.

We claim

1. A protective coating for metal surfaces comprising:
   a substantially nonaqueous colloidal suspension of inorganic silica in ethylene glycol monoethyl ether, the concentration of said silica being from 30 to 60 percent by weight of said suspension, the water content of said colloidal suspension being less than about 3 percent, and
   from 5 to 25 parts by weight of zinc dust for each 1 part by weight of said silica.

2. A protective coating as defined in claim 1 further comprising from 0.5 to 3 parts by weight of zinc chloride for each 100 parts by weight of zinc dust.

3. A protective coating as defined in claim 2 further comprising magnesium oxide in concentration of less than about 0.4 parts by weight for each 1 part by weight of said zinc chloride.

4. A protective coating as defined in claim 1 wherein said zinc dust comprises particles having a size range of from about 4 to about 10 microns, and wherein said colloidal silica comprises $SiO_2$ having an average particle size of from about 16 to about 22 millimicrons.

5. A protective coating for metal surfaces comprising:
  a substantially nonaqueous, acidic colloidal suspension of silica in ethylene glycol monoethyl 1 the concentration of said silica being from 30 to 60 percent by weight of said suspension,
  from 3 to 25 parts by weight of zinc dust for each 1 part by weight of said silica, and
  from 0.5 to 3 parts by weight of zinc chloride for each 100 parts by weight of said zinc dust.

6. A protective coating as defined in claim 5 wherein said suspension further comprises an additional polar solvent selected from the class consisting of isopropyl alcohol, butyl alcohol, methyl isobutyl ketone and butyl acetate, the weight amount of said additional solvent being less than 2.5 times the combined weight amount of said silica and said ethylene glycol monoethyl ether.

7. A protective coating as defined in claim 5 wherein said suspension further comprises an additional polar solvent selected from the class consisting of xylol, toluol or high-flash naptha, the concentration of said additional polar solvent being less than about 50 parts by weight for each 100 parts by weight combined silica and ethylene glycol monoethyl ether.

8. A method of making a protective coating for metal surfaces, comprising the steps of:
  combining a polar solvent with an acid-stabilized, aqueous colloidal silica sol, said solvent consisting of monoethylene glycol monoethyl ether,
  fractionally distilling said combined solvent and sol to eliminate substantially all water therefrom, and to provide a resultant suspension wherein the concentration of said silica is from 30 to 60 percent by weight, and
  adding zinc chloride and zinc dust to said resultant suspension.

9. The method defined in claim 8 wherein said fractional distillation is accomplished under vacuum and at a temperature on the order of 50° C.

10. The method defined in claim 8 wherein the concentration of said zinc dust is from 5 to 25 parts by weight for each 1 part by weight of said silica, and wherein the concentration of said zinc chloride is from 0.5 to 3 parts by weight of zinc chloride for each 100 parts by weight of said zinc dust.